United States Patent
Wong et al.

(10) Patent No.: US 9,785,691 B2
(45) Date of Patent: Oct. 10, 2017

(54) METHOD AND APPARATUS FOR SEQUENCING TRANSACTIONS GLOBALLY IN A DISTRIBUTED DATABASE CLUSTER

(75) Inventors: Frankie Wong, Pickering (CA); Xiong Yu, North York (CA); Elaine Wang, Aurora (CA)

(73) Assignee: Open Invention Network, LLC, Durham, NC (US)

( * ) Notice: Subject to any disclaimer, the term of this patent is extended or adjusted under 35 U.S.C. 154(b) by 1076 days.

(21) Appl. No.: 12/149,927

(22) Filed: May 9, 2008

(65) Prior Publication Data

US 2009/0106323 A1  Apr. 23, 2009

Related U.S. Application Data

(63) Continuation of application No. 11/221,752, filed on Sep. 9, 2005, now abandoned.

(51) Int. Cl.
*G06F 17/30* (2006.01)
*G06F 11/20* (2006.01)

(52) U.S. Cl.
CPC .... *G06F 17/30575* (2013.01); *G06F 11/2097* (2013.01)

(58) Field of Classification Search
CPC ......... G06F 17/30008; G06F 17/30212; G06F 17/30215; G06F 17/30377; G06F 17/30227; G06F 17/30371; G06F 17/30575

See application file for complete search history.

(56) References Cited

U.S. PATENT DOCUMENTS

| | | | |
|---|---|---|---|
| 5,170,480 A * | 12/1992 | Mohan et al. | |
| 5,613,106 A | 3/1997 | Thurman et al. | |
| 5,870,761 A * | 2/1999 | Demers et al. | |
| 5,878,414 A | 3/1999 | Hsiao et al. | |
| 5,940,827 A | 8/1999 | Hapner et al. | |
| 6,012,059 A | 1/2000 | Neimat et al. | |
| 6,023,720 A | 2/2000 | Aref et al. | |
| 6,185,613 B1 * | 2/2001 | Lawson et al. | 709/224 |
| 6,243,715 B1 | 6/2001 | Bogantz et al. | |
| 6,523,036 B1 * | 2/2003 | Hickman et al. | 707/704 |

(Continued)

FOREIGN PATENT DOCUMENTS

EP   1044579   11/2001

OTHER PUBLICATIONS

"Practical PostgreSQL," by Worsley & Drake (2001). Available at: http://www.commandprompt.com/ppbook/book1.htm Webarchive screenshot of the rollback function provided for Jan. 22, 2005.*

(Continued)

*Primary Examiner* — Alexey Shmatov
(74) *Attorney, Agent, or Firm* — Haynes and Boone, LLP

(57) ABSTRACT

A system and method for receiving and tracking a plurality of transactions and distributing the transactions to at least two replication queues over a network. The system and method comprise a global queue for storing a number of the received transactions in a first predetermined order. The system and method also comprise a sequencer coupled to the global queue for creating a copy of each of the transactions for each of said at least two replication queues and for distributing in a second predetermined order each said copy to each of said at least two replication queues respectively, said copy containing one or more of the received transactions.

29 Claims, 10 Drawing Sheets

(56) References Cited

U.S. PATENT DOCUMENTS

| | | | |
|---|---|---|---|
| 6,760,808 B2 | 7/2004 | Peters et al. | |
| 6,792,540 B1* | 9/2004 | Smith et al. | 726/31 |
| 6,826,182 B1* | 11/2004 | Parthasarathy | 370/390 |
| 6,862,595 B1 | 3/2005 | Elko et al. | |
| 6,920,447 B2 | 7/2005 | Pudipeddi et al. | |
| 7,065,538 B2 | 6/2006 | Aronoff et al. | |
| 7,177,886 B2 | 2/2007 | Pruet, III | |
| 7,249,163 B2 | 7/2007 | Hickson et al. | |
| 7,359,927 B1* | 4/2008 | Cardente | |
| 7,406,487 B1* | 7/2008 | Gupta et al. | |
| 7,734,605 B2 | 6/2010 | Chouanard et al. | |
| 7,801,851 B2 | 9/2010 | Holenstein et al. | |
| 8,156,110 B1 | 4/2012 | Luo et al. | |
| 8,635,256 B2 | 1/2014 | Chinner et al. | |
| 2001/0032282 A1 | 10/2001 | Marietta et al. | |
| 2002/0133491 A1 | 9/2002 | Sim et al. | |
| 2002/0133507 A1 | 9/2002 | Holenstein et al. | |
| 2002/0194015 A1* | 12/2002 | Gordon et al. | 705/1 |
| 2003/0177321 A1* | 9/2003 | Watanabe | 711/161 |
| 2003/0182464 A1* | 9/2003 | Hamilton et al. | 709/314 |
| 2003/0212738 A1 | 11/2003 | Wookey et al. | |
| 2004/0034640 A1 | 2/2004 | Jain et al. | |
| 2004/0133591 A1 | 7/2004 | Holenstein et al. | |
| 2004/0158588 A1 | 8/2004 | Pruett | |
| 2004/0162859 A1* | 8/2004 | Guo et al. | 707/204 |
| 2004/0177111 A1* | 9/2004 | Vincent et al. | 709/203 |
| 2004/0199553 A1 | 10/2004 | Byrne et al. | |
| 2004/0264241 A1* | 12/2004 | Todd | 365/158 |
| 2005/0021567 A1* | 1/2005 | Holenstein et al. | 707/200 |
| 2005/0027892 A1* | 2/2005 | McCabe et al. | 709/253 |
| 2005/0049945 A1* | 3/2005 | Bourbonnais et al. | 705/30 |
| 2005/0080825 A1 | 4/2005 | Fleck et al. | |
| 2005/0114285 A1* | 5/2005 | Cincotta | 707/1 |
| 2005/0210081 A1* | 9/2005 | Fleck et al. | 707/204 |
| 2006/0190497 A1* | 8/2006 | Inturi et al. | 707/201 |
| 2006/0212493 A1* | 9/2006 | Aronoff et al. | 707/202 |
| 2007/0027896 A1 | 2/2007 | Newport et al. | |
| 2007/0088970 A1 | 4/2007 | Buxton et al. | |
| 2007/0174346 A1 | 7/2007 | Brown et al. | |

OTHER PUBLICATIONS

Canadian Patent Office, Office Action for Application No. 2,619,778, mailed Nov. 7, 2014, 9 pages.

Canadian Patent Office, International Search Report and Written Opinion for International Application No. PCT/CA2006/001474, Mailing date Dec. 22, 2006, 7 pages.

Canadian Patent Office, International Search Report and Written Opinion for International Application No. PCT/CA2006/001475, Mailing date Dec. 28, 2006, 6 pages.

Teradata, "Concurrency Control and Transaction Recovery," retrieved from http://web.archive.org/web/20010819054744/http:/teradata.uark.edu/research/guo/control.html, Aug. 10, 2001, pp. 11 pages.

* cited by examiner

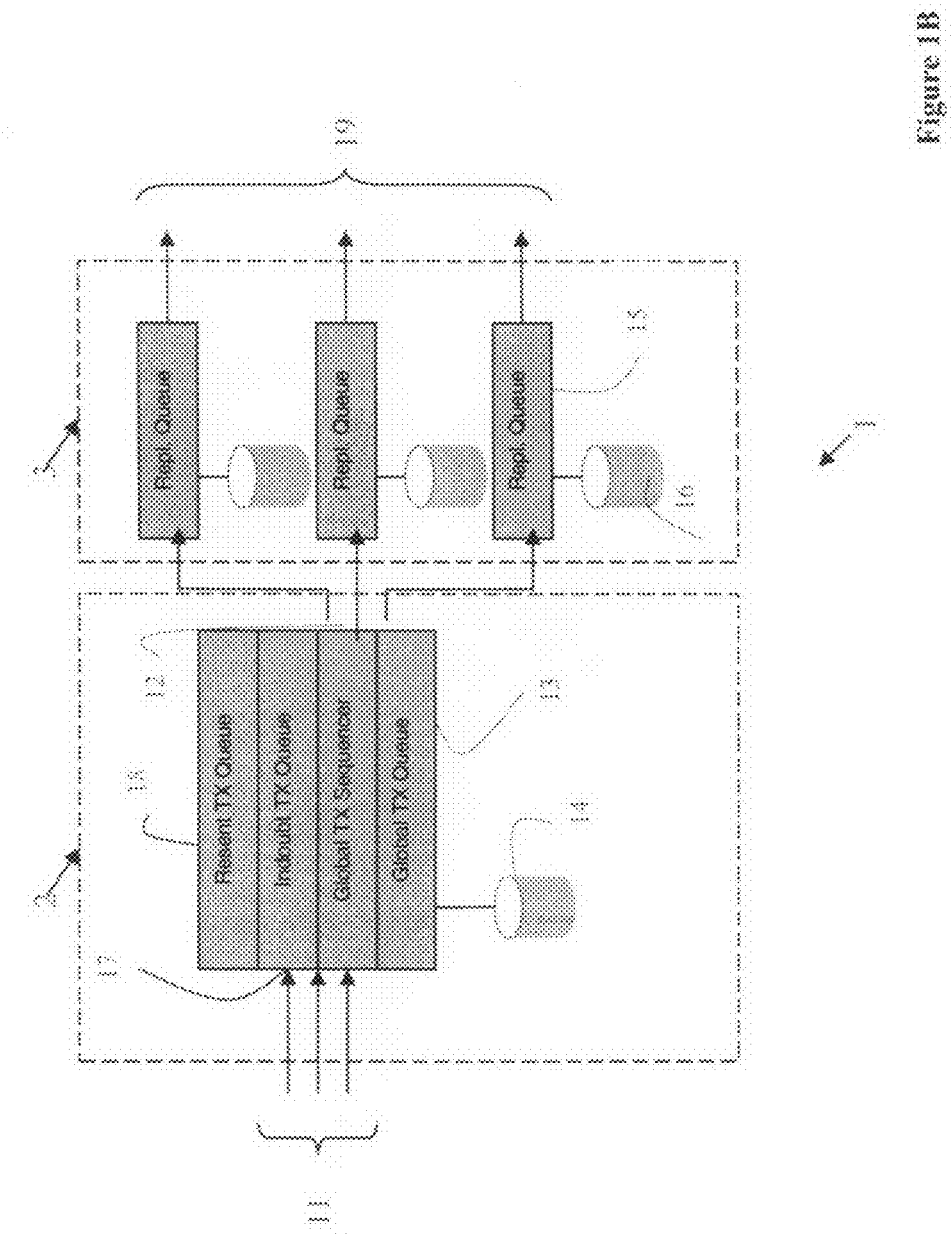

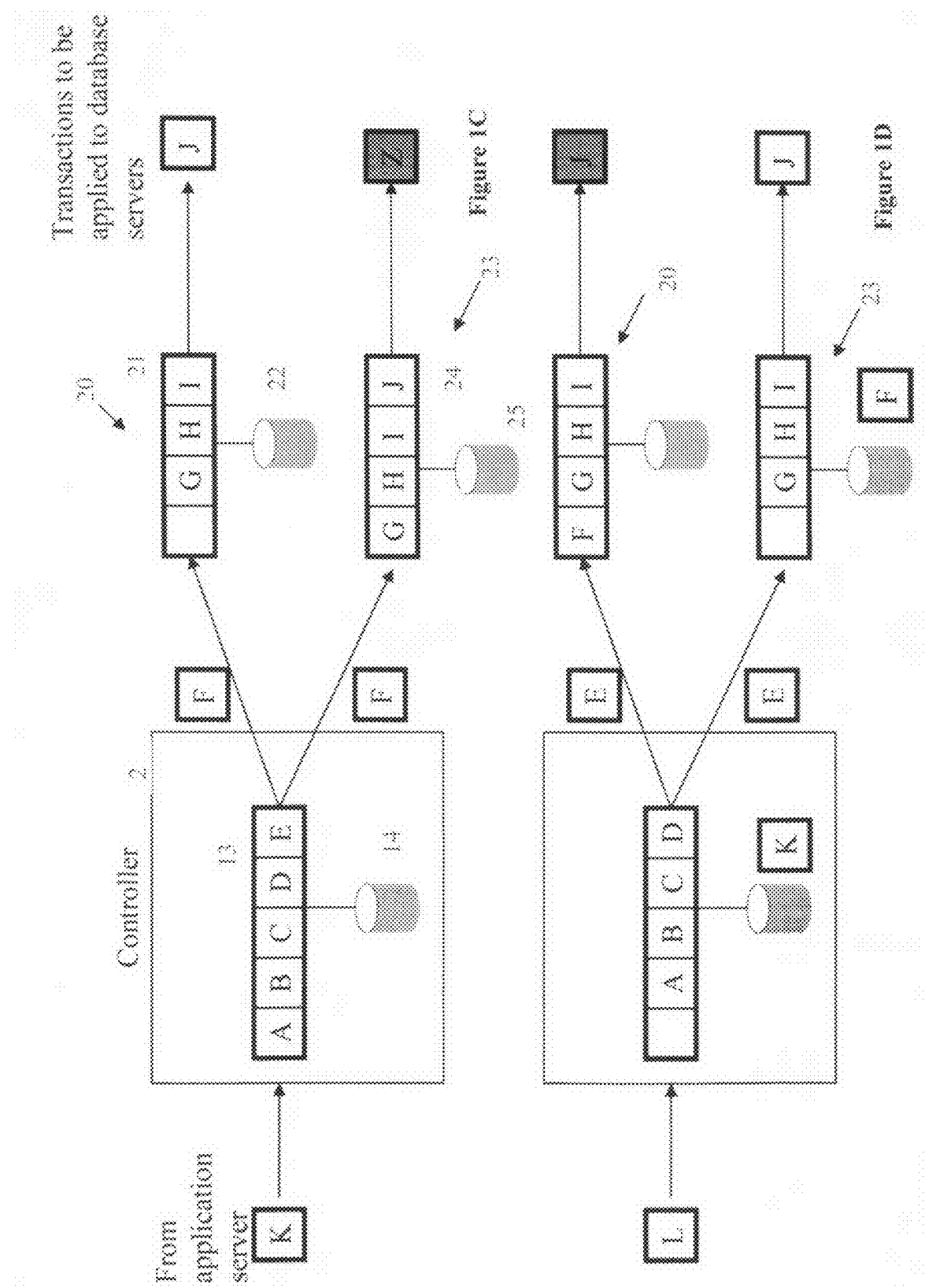

METHOD AND APPARATUS FOR SEQUENCING TRANSACTIONS GLOBALLY IN A DISTRIBUTED DATABASE CLUSTER (This application is a Continuation of U.S. patent application Ser. No. 11/221,752, filed Sep. 9, 2005 now abandoned, in its entirety herein incorporated by reference.)

FIELD OF THE INVENTION

This invention relates generally to the sequencing and processing of transactions within a cluster of replicated databases.

BACKGROUND OF THE INVENTION

A database has become the core component of most computer application software nowadays. Typically application software makes use of a single or multiple databases as repositories of data (content) required by the application to function properly. The application's operational efficiency and availability is greatly dependent on the performance and availability of these database(s), which can be measured by two metrics: (1) request response time; and (2) transaction throughput.

There are several techniques for improving application efficiency based on these two metrics: (1) Vertical scale up of computer hardware supporting the application —this is achieved by adding to or replacing existing hardware with faster central processing units (CPUs), random access memory (RAM), disk adapters/controllers, and network; and (2) Horizontal scale out (clustering) of computer hardware supporting the application—this approach refers to connecting additional computing hardware to the existing configuration by interconnecting them with a fast network. Although both approaches can address the need of reducing request response time and increase transaction throughput, the scale out approach can offer higher efficiency at lower costs, thus driving most new implementations into clustering architecture.

The clustering of applications can be achieved readily by running the application software on multiple, interconnected application servers that facilitate the execution of the application software and provide hardware redundancy for high availability, with the application software actively processing requests concurrently.

However current database clustering technologies cannot provide the level of availability and redundancy in a similar active-active configuration. Consequently database servers are primarily configured as active-standby, meaning that one of the computer systems in the cluster does not process application request until a failover occurs. Active-standby configuration wastes system resources, extends the windows of unavailability and increases the chance of data loss.

To cluster multiple database servers in an active-active configuration, one technical challenge is to resolve update conflict. An update conflict refers to two or more database servers updating the same record in the databases that they manage. Since data in these databases must be consistent among them in order to scale out for performance and achieve high availability, the conflict must be resolved. Currently there are two different schemes of conflict resolution: (1) time based resolution; and (2) location based resolution. However, neither conflict resolution schemes can be enforced without some heuristic decision to be made by human intervention. It is not possible to determine these heuristic decision rules unless there is a thorough understanding of the application software business rules and their implications. Consequently, most clustered database configurations adopt the active-standby model, and fail to achieve high performance and availability at the same time. There is a need for providing a database management system that uses an active-active configuration and substantially reduces the possibility of update conflicts that may occur when two or more databases attempt to update a record at the same time.

The systems and methods disclosed herein provide a system for globally managing transaction requests to one or more database servers and to obviate or mitigate at least some of the above presented disadvantages.

SUMMARY OF THE INVENTION

To cluster multiple database servers in an active-active configuration, one technical challenge is to resolve update conflict. An update conflict refers to two or more database servers updating the same record in the databases that they manage. Since data in these databases must be consistent among them in order to scale out for performance and achieve high availability, the conflict must be resolved. Currently there are two different schemes of conflict resolution: (1) time based resolution; and (2) location based resolution. However, neither conflict resolution schemes can be enforced without some heuristic decision to be made by human intervention. Consequently, most clustered database configurations adopt the active-standby model, and fail to achieve high performance and availability at the same time. Contrary to current database configurations there is provided a system and method for receiving and tracking a plurality of transactions and distributing the transactions to at least two replication queues over a network. The system and method comprise a global queue for storing a number of the received transactions in a first predetermined order. The system and method also comprise a sequencer coupled to the global queue for creating a copy of each of the transactions for each of said at least two replication queues and for distributing in a second predetermined order each said copy to each of said at least two replication queues respectively, said copy containing one or more of the received transactions.

One aspect provided is a system for receiving and tracking a plurality of transactions and distributing the transactions to at least two replication queues over a network, the system comprising: a global queue for storing a number of the received transactions in a first predetermined order; and a sequencer coupled to the global queue for creating a copy of each of the transactions for each of said at least two replication queues and for distributing in a second predetermined order each said copy to each of said at least two replication queues respectively, said copy containing one or more of the received transactions.

A further aspect provided is a system for receiving a plurality of transactions from at least one application server, distributing the transactions to at least two replication queues and applying the transactions to a plurality of databases comprising: a director coupled to each of said at least one application server for capturing a plurality of database calls therefrom as the plurality of transactions; and a controller for receiving each of the plurality of transactions, the controller configured for storing the transactions within a global queue in a predetermined order, for generating a copy of each said transaction for each of said at least two replication queues, and for transmitting in the predetermined order each said copy to each of said at least two replication queues respectively.

A still further aspect provided is a method for receiving and tracking a plurality of transactions and distributing the transactions to at least two replication queues over a network, the method comprising: storing a number of the received transactions in a first predetermined order in a global queue; creating a copy of each of the transactions for each of said at least two replication queues; and distributing in a second predetermined order each said copy to each of said at least two replication queues respectively, said copy containing one or more of the received transactions.

A still further aspect provided is a system for receiving and tracking a plurality of transactions and distributing the transactions to at least two replication queues over a network, the system comprising: means for storing a number of the received transactions in a first predetermined order; and means for creating a copy of each of the transactions for each of said at least two replication queues and for distributing in a second predetermined order each said copy to each of said at least two replication queues respectively, said copy containing one or more of the received transactions.

BRIEF DESCRIPTION OF THE DRAWINGS

Exemplary embodiments of the invention will now be described in conjunction with the following drawings, by way of example only, in which:

FIG. 1B is a block diagram of a transaction replicator of the system of FIG. 1A;

FIGS. 1C, 1D and 1E show an example operation of receiving and processing transactions for the system of FIG. 1A;

DETAILED DESCRIPTION OF THE PREFERRED EMBODIMENTS

A method and apparatus for sequencing transactions in a database cluster is described for use with computer programs or software applications whose functions are designed primarily to replicate update transactions to one or more databases such that data in these databases are approximately synchronized for read and write access.

Figure 1A:
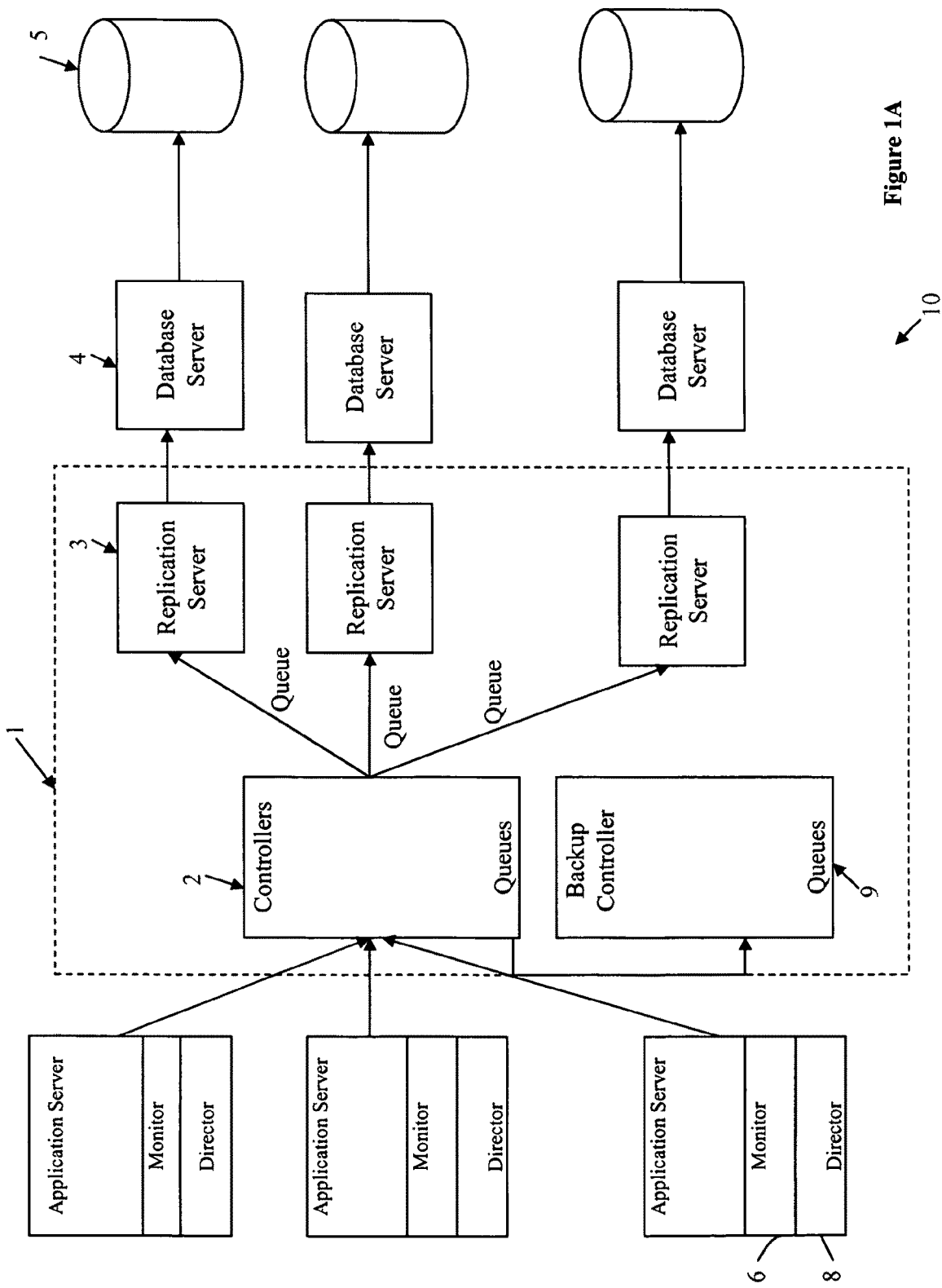
FIG. 1A is a block diagram of a system for sequencing transactions.

Referring to FIG. 1A, shown is a system 10 comprising a plurality of application servers 7 for interacting with one or more database servers 4 and one or more databases 5 via a transaction replicator 1. It is understood that in two-tier applications, each of the application 7 instances represents a client computer. For three-tiered applications, each of the application 7 instances represents an application server that is coupled to one or more users (not shown). Accordingly, it is recognized that the transaction replicator 1 can receive transactions from applications 7, application servers 7, or a combination thereof.

Referring to FIGS. 1A and 1B, the transaction replicator 1 of the system 10, receives transaction requests from the application servers 7 and provides sequenced and replicated transactions using a controller 2 to one or more replication servers 3, which apply the transactions to the databases 5. By providing sequencing of transactions in two or more tiered application architectures, the transaction replicator 1 helps to prevent the transaction requests from interfering with each other and facilitates the integrity of the databases 5. For example, a transaction refers to a single logical operation from a user application 7 and typically includes requests to read, insert, update and delete records within a predetermined database 5.

Referring again to FIG. 1A, the controller 2 can be the central command center of the transaction replicator 1 that can run for example on the application servers 7, the database servers 4 or dedicated hardware. The controller 2 may be coupled to a backup controller 9 that is set up to take over the command when the primary controller 2 fails. The backup controller 9 is approximately synchronized with the primary controller 2 such that transaction integrity is preserved. It is recognized that the controller 2 and associated transaction replicator 1 can also be configured for use as a node in a peer-to-peer network, as further described below.

Referring again to FIG. 1A, when a backup and a primary controller are utilized, a replica global transaction queue is utilized. The backup controller 9 takes over control of transaction replicator 1 upon the failure of the primary controller 2. Preferably, the primary and backup controllers are installed at different sites and a redundant WAN is recommended between the two sites.

As is shown in FIG. 1B, the controller 2 receives input transactions 11 from a user application 7 and provides sequenced transactions 19 via the replication servers 3, the sequenced transactions 19 are then ready for commitment to the database servers 4. The controller 2 comprises a resent transaction queue 18 (resent TX queue), an indoubt transaction queue 17 (indoubt TX queue), a global transaction sequencer 12 (global TX sequencer), a global TX queue 13 (global TX queue) and at least one global disk queue 14. The global queue 13 (and other queues if desired) can be configured as searchable a first-in-first out pipe (FIFO) or as a first-in-any-out (FIAO), as desired. For example, a FIFO queue 13 could be used when the contents of the replication queues 15 are intended for databases 5, and a FIAO queue 13 could be used when the contents of the replication queues 15 are intended for consumption by unstructured data processing environments (not shown). Further, it is recognized that the global disk queue 14 can be configured for an indexed and randomly accessible data set.

The transaction replicator 1 maintains the globally sequenced transactions in two different types of queues: the global TX queue 13 and one or more replication queues 15 equal to that of the database server 4 instances. These queues are created using computer memory with spill over area on disks such as the global disk queue 14 and one or more replication disk queues 16. The disk queues serve a number of purposes including: persist transactions to avoid transaction loss during failure of a component in the cluster; act as a very large transaction storage (from gigabytes to terabytes) that computer memory cannot reasonably provide (typically less than 64 gigabytes). Further, the indoubt TX queue 17 is only used when indoubt transactions are detected after a certain system failures. Transactions found in this queue have an unknown transaction state and require either human intervention or pre-programmed resolution methods to resolve.

For example, in the event of a temporary communication failure resulting in lost response from the global TX sequencer 12 to a transaction ID request, the application resends the request which is then placed in the resent TX queue 18. Under this circumstance, there can be two or more transactions with different Transaction ID in the global TX queue 13 and duplicated transactions are removed subsequently.

In normal operation, the controller 2 uses the global TX queue 13 to track the status of each of the input transactions and to send the committed transaction for replication in sequence. It is recognized that monitoring of the status of the transactions can be done by the director 8, the controller 2, or combination thereof.

Figure 1E:
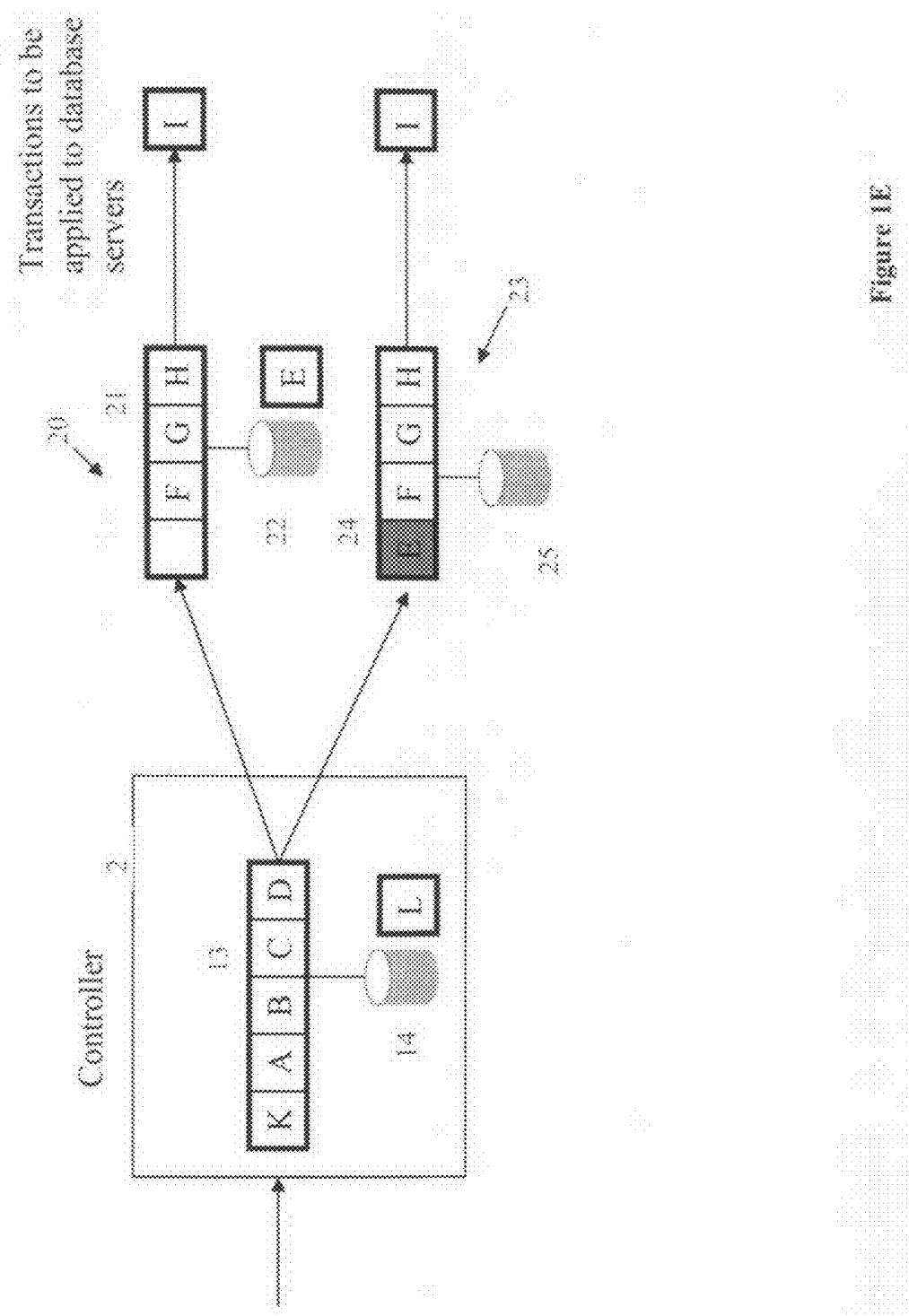

Referring to FIGS. 1C, 1D, and 1E, shown is an example operation of the system 10 for receiving and processing a new transaction. In one embodiment, the new transaction is placed in the global queue 13 at commit time, e.g. when the transaction ID (represented by references K, L) is issued, thus denoting to the director 8 (or other database 5 status monitoring entity) that the transaction transmit request is recordable to signify the application 7 is allowed to commit its transmit request (associated with the new transaction) to the database 5. Commit time can be defined to include the step of: 1) the transmit request (associated with the application 7 and the new transaction) are recorded at the director 8; 2) thus providing for passing of the new transaction (e.g. a SQL statement) to the controller 2 by the director 8; 3) the controller 2 then issues the transaction ID (e.g. a commit token K, L) coupled to the new transaction; and 4) the new transaction along with the issued transaction ID (e.g. K, L) are added to the transaction sequence held in the global queue 13.

For example, upon receiving a new transaction, the sequencer 12 assigns a new transaction ID to the received transaction. The transaction ID is a globally unique sequence number for each transaction within a replication group. In FIG. 1C, the sequence ID for the newly received transaction is "K". Once the controller 2 receives the transaction, the transaction and its ID are transferred to the global TX queue 20 if there is space available. Otherwise, if the global TX queue 13 is above a predetermined threshold and is full, for example, as shown in FIG. 1C, the transaction K and its ID are stored in the global disk queue 14 (FIG. 1D).

Before accepting any new transactions in the global TX queue, the sequencer distributes the committed transactions from the global TX queue 13 to a first replication server 20 and a second (or more) replication server 23 for execution against the databases. As will be discussed, the transfer of the transactions to the replication servers can be triggered when at least one of the following two criteria occurs: 1) a predetermined transfer time interval and 2) a predetermined threshold for the total number of transactions within the global TX queue 13 is met. However, each replication server 20, 23 has a respective replication queue 21, 24 and applies the sequenced transactions, obtained from the global queue 13, at its own rate.

For example, when a slower database server is unable to process the transactions at the rate the transactions are distributed by the controller 2, the transactions in the corresponding replication queue are spilled over to the replication disk queues. As shown in FIGS. 1C and 1D, transaction F is transferred from the global TX queue 13 to the first and second replication servers 20, 23. The first replication server 20 has a first replication queue 21 and a first replication disk queue 22 and the second replication server 23 has a second replication queue 22 and a second replication disk queue 25. The replication queues are an ordered repository of update transactions stored in computer memory for executing transactions on a predetermined database. In this case, since the second replication queue 24 is above a predetermined threshold (full, for example) transaction F is transferred to the second replication disk queue 25. Referring to FIG. 1D and FIG. 1E, once space opens up in the second replication queue 24 as transaction J is applied to its database server, the unprocessed transaction F in the second replication disk queue 25 is moved to the second replication queue 24 for execution of the transaction request against the data within its respective database. In the case where both the replication disk queue and the replication queues are above a preselected threshold (for example, full), an alert is sent by the sequencer 12 and the database is marked unusable until the queues become empty.

The core functions of the controller 2 can be summarized as registering one or more directors 8 and associating them with their respective replication groups; controlling the replication servers' 3 activities; maintaining the global TX queue 13 that holds all the update transactions sent from the directors 8; synchronizing the global TX queue 13 with the backup controller 9 (where applicable); managing all replication groups defined; distributing committed transactions to the replication servers 3; tracking the operational status of each database server 4 within a replication group; providing system status to a monitor 6; and recovering from various system failures.

The registry function of the controller 2 occurs when applications are enabled on a new application server 7 to access databases 5 in a replication group. Here, the director 8 on the new application server contacts the controller 2 and registers itself to the replication group. Advantageously, this provides dynamic provisioning of application servers to scale up system capacity on demand. The registration is performed on the first database call made by an application. Subsequently the director 8 communicates with the controller 2 for transaction and server status tracking.

The replication server control function allows the controller 2 to start the replication servers 3 and monitors their state. For example, when an administrator requests to pause replication to a specific database 5, the controller then instructs the replication server to stop applying transactions until an administrator or an automated process requests it.

The replication group management function allows the controller 2 to manage one or more groups of databases 5 that require transaction synchronization and data consistency among them. The number of replication groups that can be managed and controlled by the controller 2 is dependent upon the processing power of the computer that the controller is operating on and the sum of the transaction rates of all the replication groups.

Director

Figure 2:
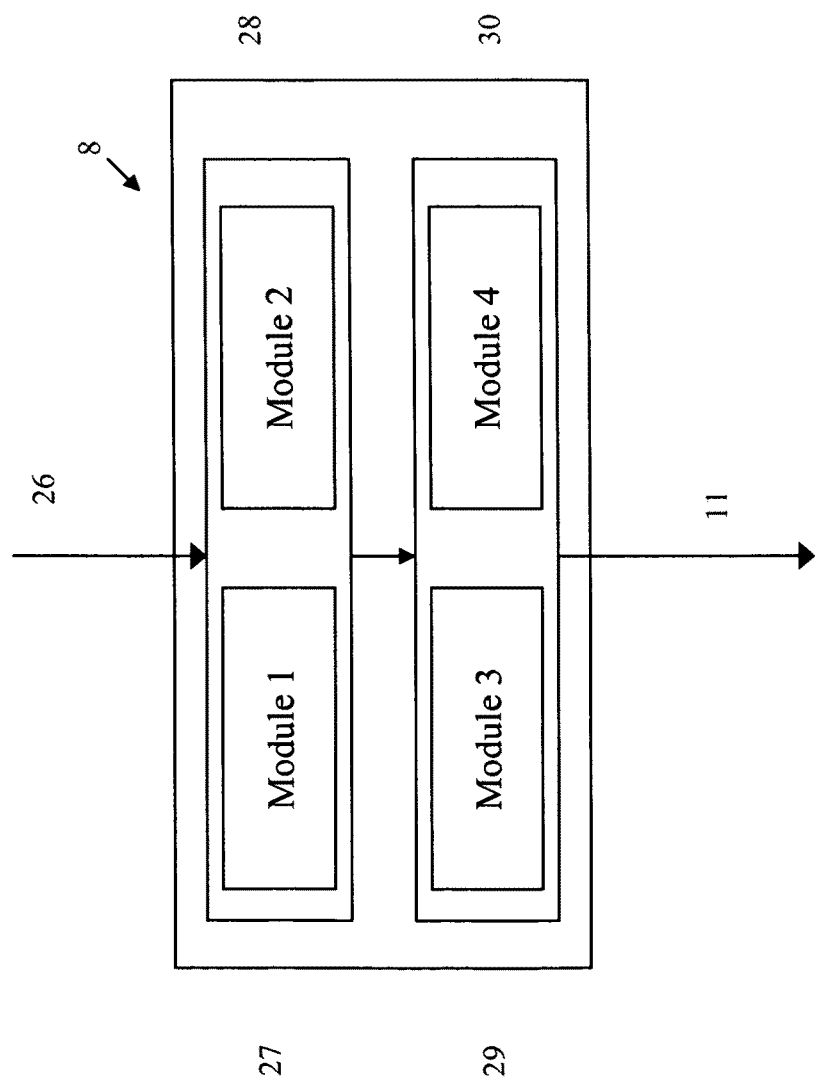
FIG. 2 is a block diagram of a director of the system of FIG. 1A.

Referring to FIG. 2, shown is a block diagram of the director 8 of the system 10 of FIG. 1A. The director can be installed on the application server 7 or the client computer. The director 8 is for initiating a sequence of operations to track the progress of a transaction. The director 8 comprises a first 27, a second 28, a third 29 and a fourth 30 functional module. According to an embodiment of the system 10, the director 8 wraps around a vendor supplied JDBC driver. As discussed earlier, the director 8 is typically installed on the application server 7 in a 3-tier architecture, and on the client computer in a 2-tier architecture. As a wrapper, the director 8 can act like an ordinary JDBC driver to the applications 7, for example. Further, the system 10 can also support any of the following associated with the transaction requests, such as but not limited to:

1. a database access driver/protocol based on SQL for a relational database 5 (ODBC, OLE/DB, ADO.NET, RDBMS native clients, etc. . . . );
2. messages sent over message queues of the network;
3. XML (and other structured definition languages) based transactions; and
4. other data access drivers as desired.

As an example, the first module 27 captures all JDBC calls 26, determines transaction type and boundary, and analyzes the SQLs in the transaction. Once determined to be an update transaction, the director 8 initiates a sequence of operations to track the progress of the transaction until it ends with a commit or rollback. Both DDL and DML are captured for replication to other databases in the same replication group.

The second module 28 collects a plurality of different statistical elements on transactions and SQL statements for analyzing application execution and performance characteristics. The statistics can be exported as comma delimited text file for importing into a spreadsheet.

In addition to intercepting and analyzing transactions and SQL statements, the director's third module 29, manages database connections for the applications 7. In the event that one of the databases 5 should fail, the director 8 reroutes transactions to one or more of the remaining databases. Whenever feasible, the director 8 also attempts to re-execute the transactions to minimize in flight transaction loss. Accordingly, the director 8 has the ability to instruct the controller 2 as to which database 5 is the primary database for satisfying the request of the respective application 7.

Depending on a database's workload and the relative power settings of the database servers 4 in a replication group, the director 8 routes read transactions to the least busy database server 4 for processing. This also applies when a database server 4 failure has resulted in transaction redirection.

Similarly, if the replication of transactions to a database server 4 becomes too slow for any reason such that the transactions start to build up and spill over to the replication disk queue 16, the director 8 redirects all the read transactions to the least busy database server 4. Once the disk queue becomes empty, the director 8 subsequently allows read access to that database. Accordingly, the fill/usage status of the replication disk queues in the replication group can be obtained or otherwise received by the director 8 for use in management of through-put rate of transactions applied to the respective databases 5.

For example, when the director 8 or replication servers 3 fails to communicate with the database servers 4, they report the failure to the controller 2 which then may redistribute transactions or take other appropriate actions to allow continuous operation of the transaction replicator 1. When one of the database servers 4 cannot be accessed, the controller 2 instructs the replication server 3 to stop applying transactions to it and relays the database lock down status to a monitor 6. The transactions start to accumulate within the queues until the database server 3 is repaired and the administrator or an automated process instructs to resume replication via the monitor 6. The monitor 6 may also provide other predetermined administrative commands (for example: create database alias, update parameters, changing workload balancing setting).

Monitor

Referring again to FIG. 1A, the monitor 6 allows a user to view and monitor the status of the controllers 2, the replication servers 3, and the databases 5. Preferably, the monitor 6 is a web application that is installed on an application or application server 7 and on the same network as the controllers 2.

Figure 3:
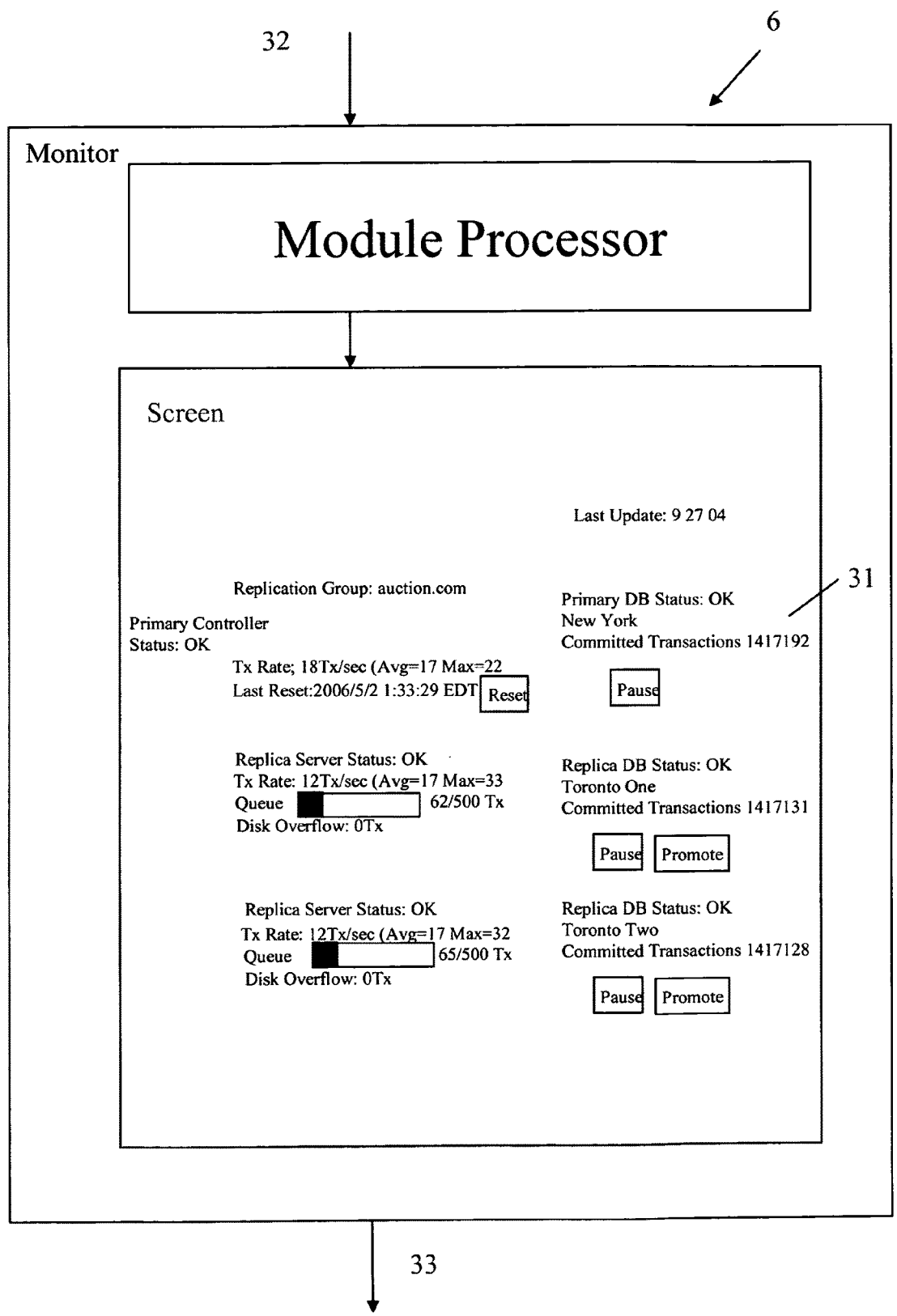
FIG. 3 is a block diagram of a monitor of the system of FIG. 1A.

Referring to FIG. 3, shown is a diagrammatic view of the system monitor 6 for use with the transaction replicator 1. The system monitor 6 receives input data 32 from both primary and backup controllers 2, 9 (where applicable), replication servers 3, the database servers 4 and relevant databases 5 within a replication group. This information is used to display an overall system status on a display screen 31.

For example, depending on whether the controller is functioning or a failure has occurred, the relevant status of the controller 2 is shown. Second, the status of each of the replication servers 3 within a desired replication group is shown. A detailed description of the transaction rate, the number of transactions within each replication queue 15, the number transactions within each replication disk queue 16 is further shown. The monitor 6 further receives data regarding the databases 5 and displays the status of each database 5 and the number of committed transactions.

The administrator can analyze the above information and choose to manually reroute the transactions. For example, when it is seen that there exists many transactions within the replication disk queue 16 of a particular replication server 3 or that the transaction rate of a replication server 3 is slow, the administrator may send output data in the form of a request 33 to distribute the transactions for a specified amount of time to a different database server within the replication group.

Figure 4:
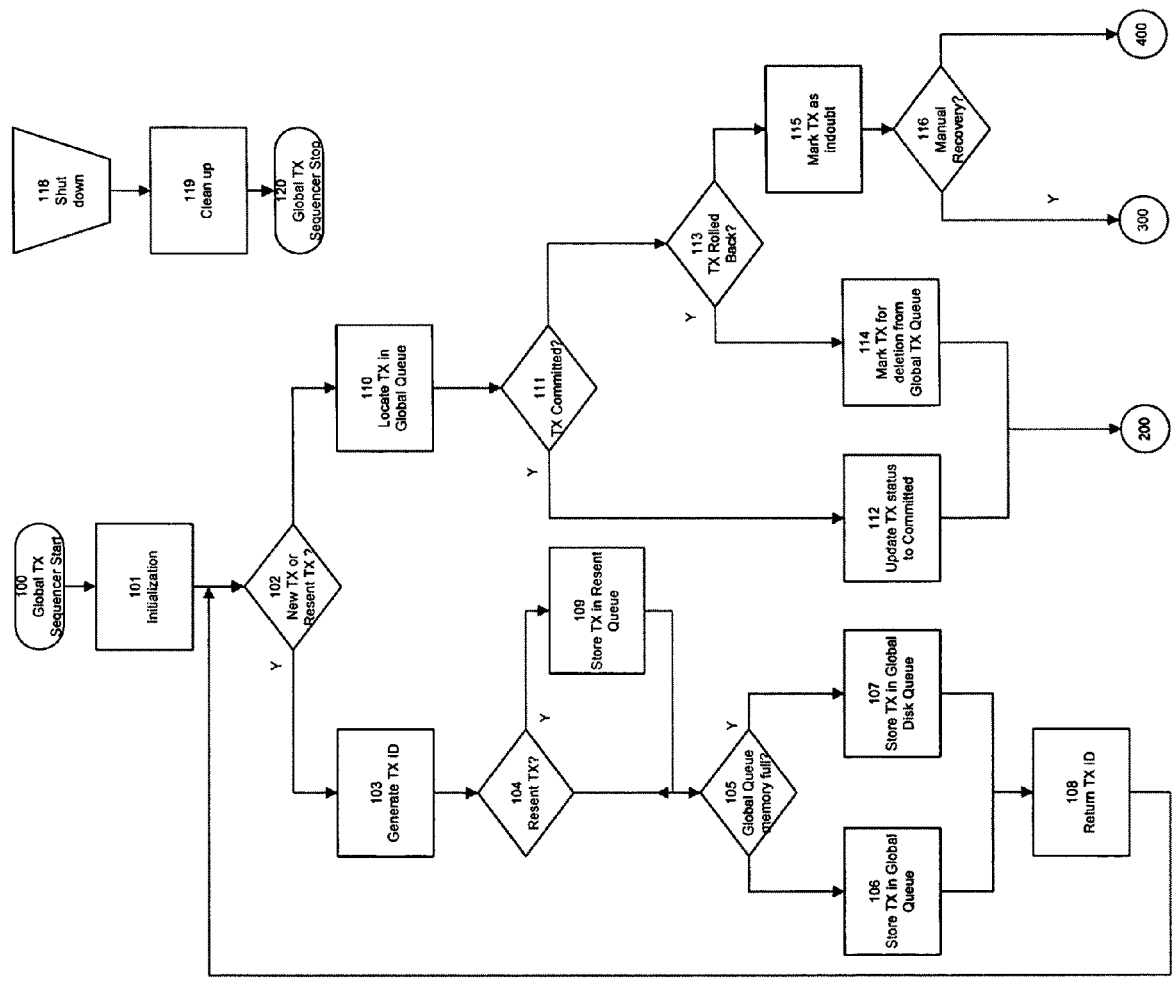
FIG. 4 is an example operation of the transaction replicator of FIG. 1B.

Referring to FIG. 4, shown is a flow diagram overview of the method 100 for initializing and processing transactions according to the invention. The global TX sequencer 12 also referred to as the sequencer hereafter and as shown in FIG. 1B, is the control logic of the transaction replicator 1.

When the controller 2 is started, it initializes itself by reading from configuration and property files the parameters to be used in the current session 101. The global TX Queue 13, indoubt TX queue 17 and resent TX queue 18 shown in FIG. 1B, are created and emptied in preparation for use. Before accepting any new transactions, the sequencer 12 examines the global disk queue 14 to determine if any transactions are left behind from previous session. For example, if a transaction is found on the global disk queue 14, it implies at least one database in the cluster is out of synchronization with the others and the database must be applied with these transactions before it can be accessed by applications. Transactions on the global disk queue 14 are read into the global TX queue 13 in preparation for applying to the database(s) 5. The sequencer 12 then starts additional servers called replication servers 3 that create and manage the replication queues 15. After initialization is complete, the sequencer 12 is ready to accept transactions from the application servers 7.

The sequencer 12 examines the incoming transaction to determine whether it is a new transaction or one that has already been recorded in the global TX queue 102. For a new transaction, the sequencer 12 assigns a Transaction ID 103 and records the transaction together with this ID in the global TX queue 13. If the new transactions ID is generated as a result of lost ID 104, the transaction and the ID are stored in the resent TX queue 109 for use in identifying duplicated transactions. The sequencer 12 checks the usage of the global TX queue 105 to determine if the maximum number of transactions in memory has already been exceeded. The sequencer 12 stores the transaction ID in the global TX queue 13 if the memory is not full 106. Otherwise, the sequencer 12 stores the transaction ID in the global disk queue 107. The sequencer 12 then returns the ID to the application 108 and the sequencer 12 is ready to process another request from the application.

When a request from the application or application server 7, comes in with a transaction that has already obtained a transaction ID previously and recorded in the global TX queue 13, the sequencer 12 searches and retrieves the entry from either the global TX queue 13 or the disk queue 110. If this transaction has been committed to the database 111, the entry's transaction status is set to "committed" 112 by the sequencer 12, indicating that this transaction is ready for applying to the other databases 200. If the transaction has been rolled back 113, the entry's transaction status is marked "for deletion" 114 and as will be described, subsequent processing 200 deletes the entry from the global TX queue. If the transaction failed with an indoubt status, the entry's transaction status is set to "indoubt" 115. An alert message is sent to indicate that database recovery may be required 116. Database access is suspended immediately until the indoubt transaction is resolved manually 300 or automatically 400.

Figure 5:
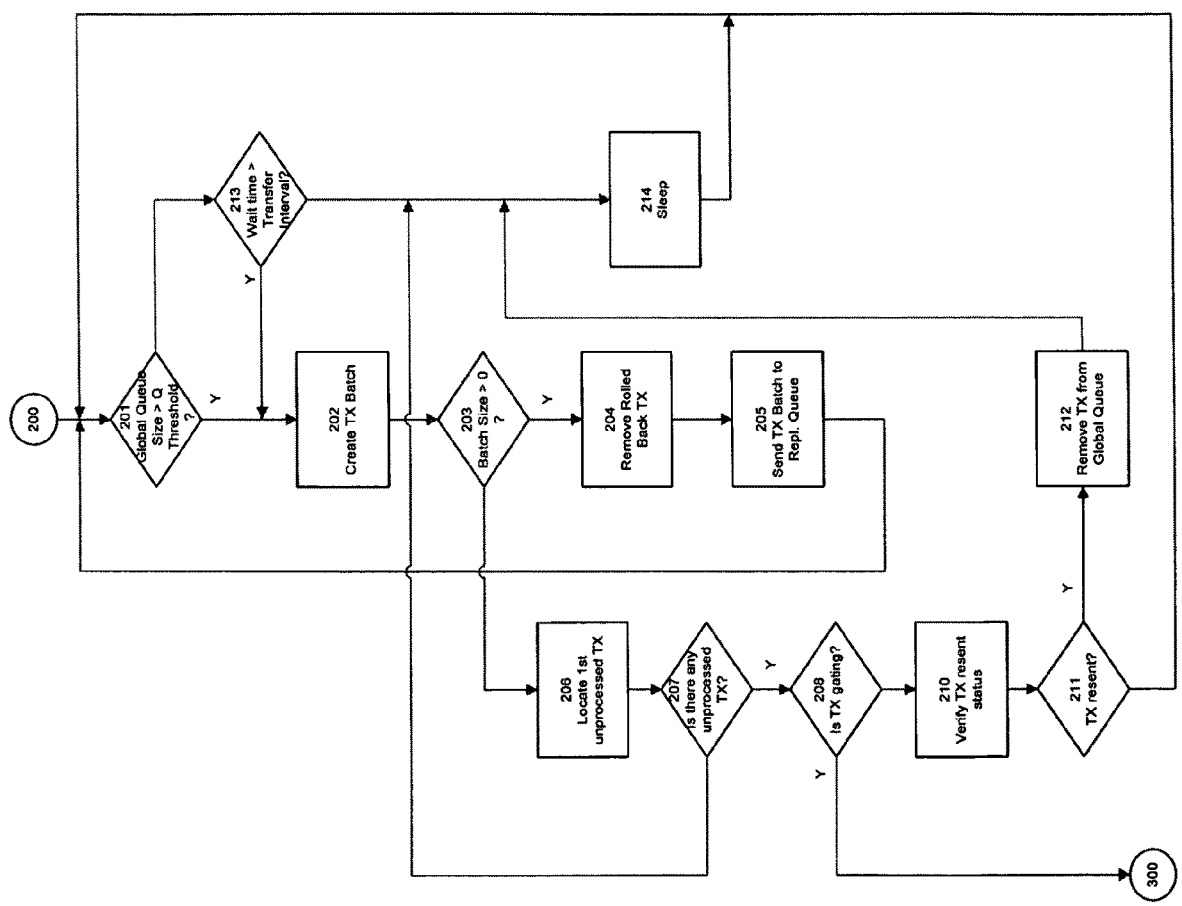
FIG. 5 is an example operation of a global transaction queue and a replication queue of FIG. 1B.

Referring to FIG. 5, shown is a flow diagram of the method 200 for distributing transactions from the global TX queue 13 according to the invention. The global TX queue 13 is used to maintain the proper sequencing and states of all update transactions at commit time. To apply the committed transactions to the other databases, the replication queue 5 is created by the sequencer 12 for each destination database. The sequencer 12 moves committed transactions from the global TX queue to the replication queue based on the following two criteria: (1) a predetermined transaction queue threshold (Q threshold) and (2) a predetermined sleep time (transfer interval).

For a system with sustained workload, the Q Threshold is the sole determining criteria to move committed transactions to the replication queue 201. For a system with sporadic activities, both the Q Threshold and transfer interval are used to make the transfer decision 201, 213. Transactions are transferred in batches to reduce communication overhead. When one or both criteria are met, the sequencer 12 prepares a batch of transactions to be moved from the global TX queue 13 to the replication queue 202. If the batch contains transactions, the sequencer 12 removes all the rolled back transactions from it because they are not to be applied to the other databases 204. The remaining transactions in the batch are sent to the replication queue for processing 205. If the batch does not contain any transaction 203, the sequencer 12 searches the global TX queue for any unprocessed transactions (status is committing) 206. Since transactions are executed in a same order of occurrence, unprocessed transactions typically occur when a previous transaction has not completed, therefore delaying the processing of subsequent transactions. A transaction that is being committed and has not yet returned its completion status is called gating transaction. A transaction that is being committed and returns a status of unknown is called indoubt transaction. Both types of transactions will remain in the state of "committing" and block processing of subsequent committed transactions, resulting in the transaction batch being empty. The difference between a gating transaction and an indoubt transaction is that gating transaction is transient, meaning that it will eventually become committed, unless there is a system failure that causes it to remain in the "gating state" indefinitely. Therefore when the sequencer 12 finds unprocessed transactions 207 it must differentiate the two types of "committing" transactions 208. For a gating transaction, the sequencer 12 sends out an alert and enters the transaction recovery process 300. Otherwise, the sequencer 12 determines if the transaction is resent from the application 210, 211, and removes the resent transaction from the global TX queue 211. A resent transaction is a duplicated transaction in the global TX queue 13 and has not been moved to the replication queue 15. The sequencer 12 then enters into a sleep because there is no transaction to be processed at the time 214. The sleep process is executed in its own thread such that it does not stop 200 from being executed at any time. It is a second entry point into the global queue size check at 201. When the sleep time is up, the sequencer 12 creates the transaction batch 202 for transfer to the replication queue 203, 204, 205.

Figure 6:
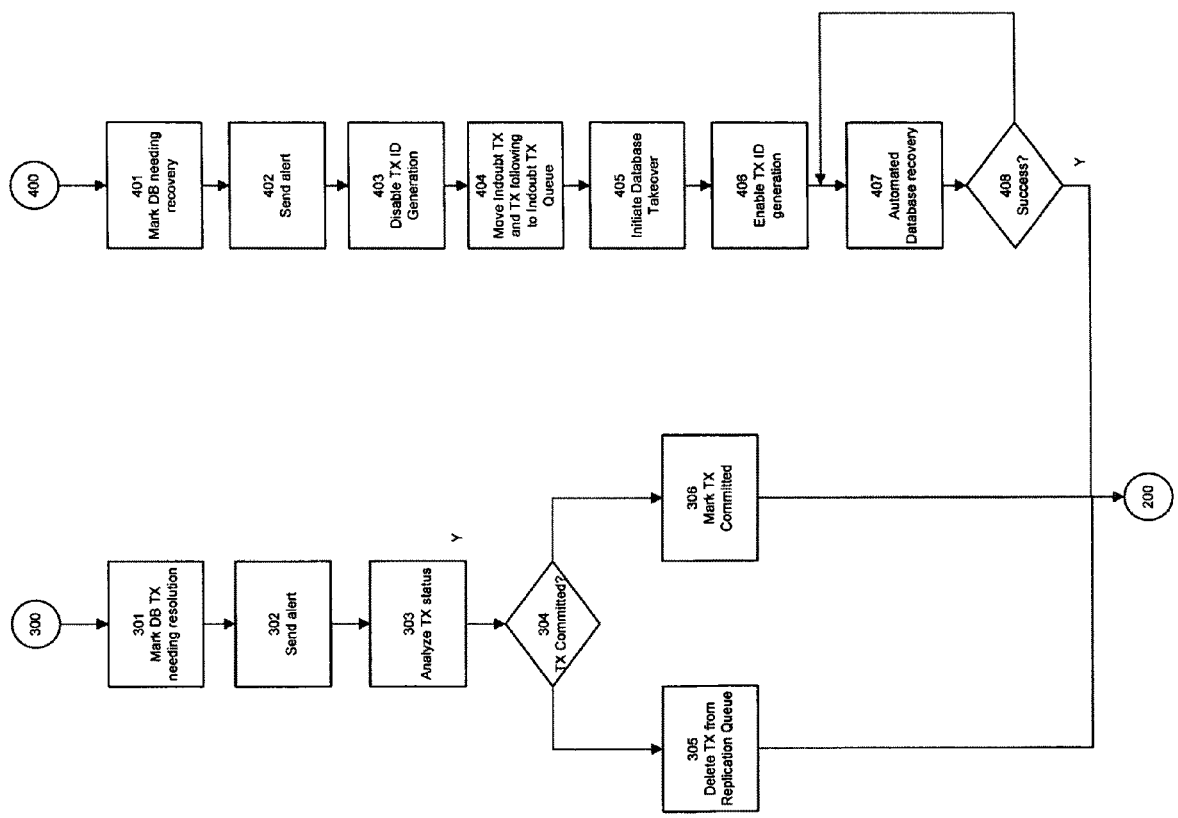
FIG. 6 is an example operation of the transaction replicator of FIG. 1B for resolving gating and indoubt transactions.

Referring to FIG. 6, shown is a flow diagram illustrating the method 300 for providing manual recovery of transactions 116 as shown in FIG. 100. There are two scenarios under which the sequencer 12 is unable to resolve gating transactions and indoubt transactions caused by certain types of failure and manual recovery may be needed. First, a gating transaction remains in the global TX queue 13 for an extended period of time, stopping all subsequent committed transactions from being applied to the other databases. Second, a transaction status is unknown after some system component failure. The sequencer 12 first identifies the transactions causing need resolution 301 and send out an alert 302. Then the transaction can be manually analyzed 303 to determine whether the transaction has been committed or rolled back in the database 304 and whether any manual action needs to be taken. If the transaction is found to have been rolled back in the database, the transaction entry is deleted manually from the global TX queue 305. If the transaction has been committed to the database, it is manually marked "committed" 306. In both cases the replication process can resume without having to recover the database 500. If the transaction is flagged as indoubt in the database, it must be forced to commit or roll back at the database before performing 304, 305 and 306.

Referring again to FIG. 6, the process 400 is entered when an indoubt transaction is detected 115 and automatic failover and recovery of a failed database is performed. Unlike gating transactions that may get resolved in the next moment, an indoubt transaction is permanent until the transaction is rolled back or committed by hand or by some heuristic rules supported by the database. If the resolution is done with heuristic rules, the indoubt transaction will have been resolved as "committed" or "rolled back" and will not require database failover or recovery. Consequently the process 400 is only entered when an indoubt transaction cannot be heuristically resolved and an immediate database failover is desirable. Under the automatic recovery process, the database is marked as "needing recovery" 401, with an alert sent out 402 by the sequencer 12. To help prevent further transaction loss, the sequencer 12 stops the generation of new transaction ID 403 and moves the indoubt transactions to the indoubt TX queue 404. While the database is marked "needing recovery" the sequencer 12 replaces it with one of the available databases in the group 405 and enables the transaction ID generation 406 such that normal global TX queue processing can continue 200. The sequencer 12 then executes a user defined recovery procedure to recover the failed database 407. For example, if the database recovery fails, the recovery process is reentered 408, 407.

Figure 7:
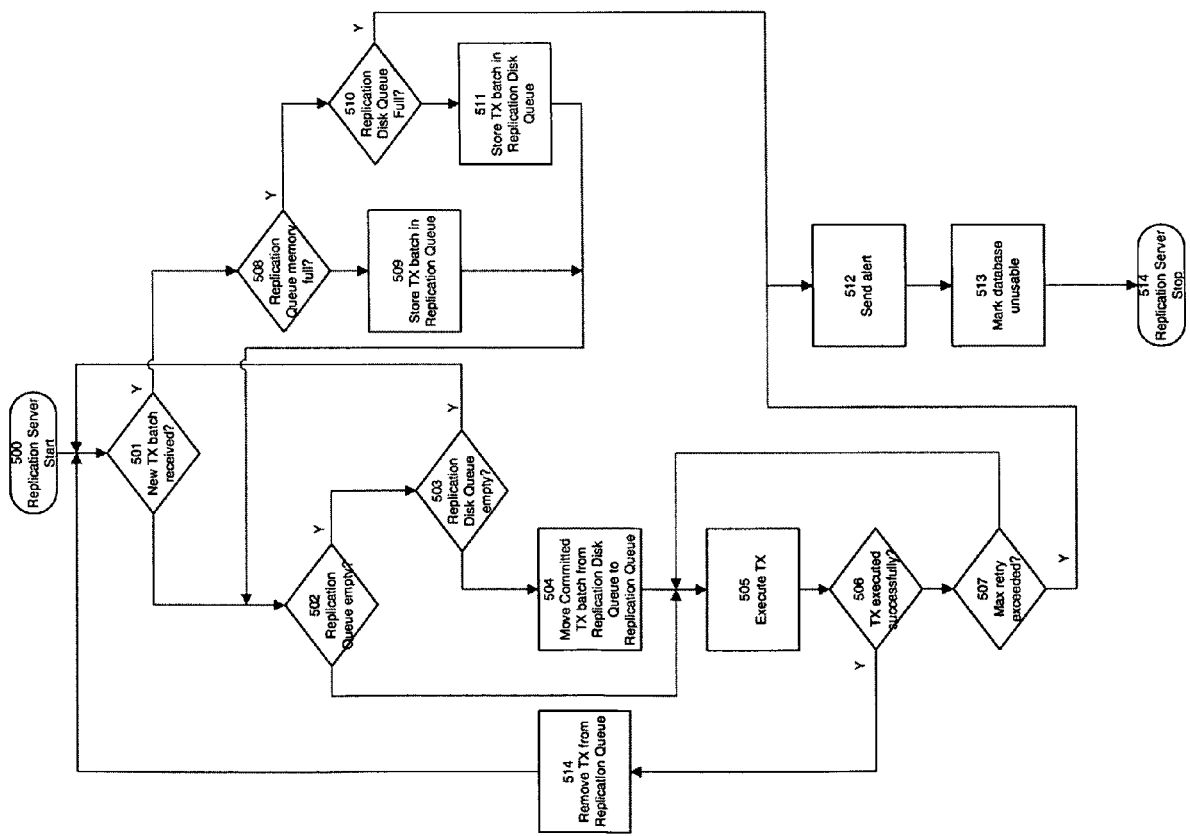
FIG. 7 is an example operation of a replication server of FIG. 1B.

Referring to FIG. 7, shown is a flow diagram illustrating the processing of committed transactions by the replication servers 3 and the management of transactions in the replication queue 15 according to the present invention. Replication queues 15 are managed by the replication servers 3 started by the sequencer 12. One of the replication servers 3 receives batches of transactions from the sequencer 12. The process 500 is entered if a new batch of committed transactions arrives or at any time when queued transactions are to be applied to the databases.

If the process is entered because of new transactions 501, the batch of transactions are stored in the replication queue in memory 508, 509, or in replication disk queue 511 if the memory queue is full. Replication disk queue capacity is determined by the amount of disk space available. If the disk is above a predetermined threshold or is full for example 510, an alert is sent 512 by the sequencer 12 and the database is marked unusable 513 because committed transactions cannot be queued up anymore.

If the process is entered in an attempt to apply transactions in the replication queue to the databases, the replication server first determines whether there is any unprocessed transaction in the replication queue in memory 502. If the memory queue is empty but unprocessed transactions are found in the replication disk queue 503, they are moved from the disk queue to the memory queue in batches for execution 504, 505. Upon successful execution 506 of all the transactions in the batch they are removed from the replication queue by the replication server and another batch of transactions are processed 501. If there are transactions in the replication disk queue 16, the processing continues until the disk queue is empty, at which time the replication server 3 waits for more transactions from the global TX queue 501. During execution of the transactions in the replication queue 15, error may occur and the execution must be retried until the maximum number of retries is exceeded 507, then an alert is sent 512 with the database marked unusable 513. However, even though a database is marked unusable, the system continues to serve the application requests. The marked database is inaccessible until the error condition is resolved. The replication server 3 stops when it is instructed by the sequencer during the apparatus shutdown process 118, 119 and 120 shown in FIG. 4.

It will be evident to those skilled in the art that the system 10 and its corresponding components can take many forms, and that such forms are within the scope of the invention as claimed. For example, the transaction replicators 1 can be configured as a plurality of transaction replicators 1 in a replicator peer-to-peer (P2P) network, in which each database server 4 is assigned or otherwise coupled to at least one principal transaction replicator 1. The distributed nature of the replicator P2P network can increase robustness in case of failure by replicating data over multiple peers (i.e. transaction replicators 1), and by enabling peers to find/store the data of the transactions without relying on a centralized index server. In the latter case, there may be no single point of failure in the system 10 when using the replicator P2P network. For example, the application or application servers 7 can communicate with a selected one of the database servers 7, such that the replicator P2P network of transaction replicators 1 would communicate with one another for load balancing and/or failure mode purposes. One example would be one application server 7 sending the transaction request to one of the transaction replicators 1, which would then send the transaction request to another of the transaction replicators 1 of the replicator P2P network, which in turn would replicate and then communicate the replicated copies of the transactions to the respective database servers 4.

Further, it is recognized that the applications/application servers 7 could be configured in an application P2P network such that two or more application computers could share their resources such as storage hard drives, CD-ROM drives, and printers. Resources would then accessible from every computer on the application P2P network. Because P2P computers have their own hard drives that are accessible by all computers, each computer can act as both a client and a server in the application P2P networks (e.g. both as an application 7 and as a database 4). P2P networks are typically used for connecting nodes via largely ad hoc connections. Such P2P networks are useful for many purposes, such as but not limited to sharing content files, containing audio, video, data or anything in digital format is very common, and realtime data, such as Telephony traffic, is also passed using P2P technology. The term "P2P network" can also mean grid computing. A pure P2P file transfer network does not have the notion of clients or servers, but only equal peer nodes that simultaneously function as both "clients" and "servers" to the other nodes on the network. This model of network arrangement differs from the client-server model where communication is usually to and from a central server or controller. It is recognized that there are three major types of P2P network, by way of example only, namely:

1) Pure P2P in which peers act as clients and server, there is no central server, and there is no central router;

2) Hybrid P2P which has a central server that keeps information on peers and responds to requests for that information, peers are responsible for hosting the information as the central server does not store files and for letting the central server know what files they want to share and for downloading its shareable resources to peers that request it, and route terminals are used as addresses which are referenced by a set of indices to obtain an absolute address; and 3) Mixed P2P which has both pure and hybrid characteristics. Accordingly, it is recognized that in the application and replicator P2P networks the applications/application servers 7 and the transaction replicators 1 can operate as both clients and servers, depending upon whether they are the originator or receiver of the transaction request respectively. Further, it is recognized that both the application and replicator P2P networks can be used in the system 10 alone or in combination, as desired.

In view of the above, the spirit and scope of the appended claims should not be limited to the examples or the description of the preferred versions contained herein.

We claim:

1. A system configured to receive and track a plurality of committed transactions and to distribute the committed transactions to at least two replication queues over a network, the system comprising:

a first computer system comprising at least one controller, the at least one controller further comprising:

a global queue configured to store a number of the received committed transactions in a first predetermined order, the received committed transactions being received from an application server separate from the first computer system;

a sequencer coupled to the global queue configured to:
prepare a batch of transactions from the number of the received committed transactions;
remove from said batch of transactions a rolled back transaction; and distribute, in a second predetermined order that is different from the first predetermined order, said batch of transactions to each of said at least two replication queues associated with at least two respective database controllers in an active-active configuration after said rolled back transaction has been removed from said batch, thereby mitigating update conflicts between databases, the active-active configuration comprising the at least two respective database controllers that are respectively configured to process transactions while the other is processing transactions; and an indoubt transaction queue in communication with the sequencer configured to receive, from the global queue, an indoubt transaction that has unknown status and that, when another transaction is received in the global queue, blocks the another transaction from being processed.

2. The system according to claim 1, wherein the sequencer is further configured to distribute said batch of transactions at a predetermined time interval.

3. The system according to claim 1, wherein the sequencer is further configured to distribute said batch of transactions when the number of the transactions within the global queue exceeds a predetermined value.

4. The system according to claim 1, wherein the sequencer is further configured to distribute said batch of transactions upon the earlier of:
a predetermined time interval; and
the number of the transactions within the global queue exceeds a predetermined value.

5. The system according to claim 4, wherein each of the transactions comprises an update transaction and a unique transaction id assigned by the sequencer.

6. The system according to claim 5, further comprising a global disk queue in communication with the global queue configured to receive and store the transactions, instead of in the global queue, in response to the global queue being above a global threshold.

7. The system according to claim 6, wherein each of said at least two replication queues have a corresponding replication disk queue configured to receive and store the transactions from the global queue, instead of in the replication queue, in response to the corresponding replication queue being above a replication threshold.

8. The system according to claim 7, wherein the global queue is further configured to receive the transactions from the global disk queue when the global disk queue is other than empty, and the global queue is further configured to receive the transactions from the application server when the global disk queue is empty.

9. The system according to claim 5, wherein the update transaction comprises at least one of a read, insert, update or delete request for at least one database in communication with at least one of said at least two replication queues.

10. The system according to claim 5, further comprising a resent transaction queue configured to store the transactions when the transactions repeated a request for the transaction id.

11. The system according to claim 1, wherein the global queue is a searchable first-in first-out pipe.

12. The system according to claim 11, wherein the sequencer is further configured to assure the order of transactions in the global queue remain consistent with their execution order at a database server coupled to at least one of the replication queues.

13. The system according to claim 11, wherein the global queue is further configured to store an indexed and randomly accessible data set.

14. The system according to claim 1, wherein the global queue and sequencer are hosted on a network entity selected from the group comprising: a central control server and a peer-to-peer node.

15. A system configured to:
receive a plurality of transactions from at least one application server comprising a processor, distribute the transactions to at least two replication queues associated with at least two respective database controllers in an active-active configuration, and apply the transactions to a respective plurality of databases controlled by the at least two respective database controllers,
wherein the at least two respective database controllers in the active-active configuration are configured to process transactions while the other is processing transactions, the system being separate from the at least one application server and comprising:
a director coupled to each of said at least one application server configured to capture a plurality of database calls therefrom as the plurality of transactions; and
a controller configured to receive each of the plurality of transactions and further configured to:
store the transactions within a global queue in a predetermined order,
generate a batch of committed transactions from the plurality of transactions stored in the global queue for each of said at least two replication queues,
remove a rolled back transaction from said batch of committed transactions,
transmit, after removing the rolled back transaction, in the predetermined order said batch of committed transactions to each of said at least two replication queues, thereby mitigating update conflicts between databases, and
move an indoubt transaction from the global queue to an indoubt queue to allow a further transaction in the global queue to be processed.

16. The system according to claim 15, further comprising:
at least two replication servers comprising said at least two replication queues,
wherein each of said at least two replication servers is coupled to each of the databases via the at least two respective database controllers, and
wherein the director is further configured to route each of the transactions to one or more of the databases relative to a workload and transaction throughput.

17. The system according to claim 16, further comprising a backup controller configured to receive the transactions from said at least one application server upon failure of the controller, the backup controller comprising a backup global queue, wherein the backup global queue is synchronized with the controller and the backup global queue is a copy of the global queue.

18. The system according to claim 15, wherein the controller is further configured to transmit in the predetermined order said batch of committed transactions such that an order of the transactions in the global queue remains consistent with an execution order at one or more of the at least two respective database controllers coupled to at least one of the at least two replication queues.

19. The system according to claim 15, wherein the controller is further configured to store a resent transaction within a resent transaction queue based on a repeated request for a transaction ID.

20. A method for receiving and tracking a plurality of transactions from an application server and distributing the transactions to at least two replication queues over a network, the method comprising:
storing, by a transaction replicator server separate from the application server, a number of the received transactions in a first predetermined order in a global queue;
creating, by the transaction replicator server, a batch of committed transactions from the transactions for each of said at least two replication queues;
removing, by the transaction replication server, a rolled back transaction from said batch of committed transactions;
distributing, by the transaction replication server in response to the removing, in a second predetermined order said batch of committed transactions to each of said at least two replication queues, the at least two replication queues being associated with at least two respective database controllers in an active-active configuration respectively configured to process transactions while the other is processing transactions, thereby mitigating update conflicts between databases, wherein distributing said batch of committed transactions comprises assuring the order of transactions in the global queue remain consistent with their execution order at a database server coupled to at least one of the replication queues; and
moving an indoubt transaction from the global queue to an indoubt transaction queue during a database recovery process.

21. The method according to claim 20, wherein the distributing of said batch of committed transactions occurs at a predetermined time interval.

22. The method according to claim 20, wherein the distributing of said batch of committed transactions occurs when the number of the transactions within the global queue exceeds a predetermined number.

23. The method according to claim 20, wherein the distributing of said batch of committed transactions occurs upon the earlier of: a predetermined time interval; and the number of the transactions within the global queue exceeds a predetermined number.

24. The method according to claim 23, wherein each of the transactions comprises an update transaction and a unique transaction id assigned by a sequencer of the transaction replicator server.

25. The method according to claim 24, wherein the update transaction comprises at least one of a read, insert, update or delete request for at least one database in communication with at least one of said at least two replication queues via a respective one of the at least two respective database controllers.

26. The method according to claim 23, further comprising receiving and storing the transactions within a global disk queue when a global queue storage capacity of the global queue reaches a global threshold.

27. The method according to claim 26, further comprising:
determining whether the global disk queue is other than empty; and
receiving the transaction from the global disk queue rather than receiving the transactions from said application server when the global disk queue is other than empty.

28. The method according to claim 23, further comprising:
determining when at least one of said at least two replication queues are above a replication threshold, each of said at least two replication queues having a corresponding replication disk queue;
storing a number of the transactions within said corresponding replication disk queue based upon the determination; and
sending an alert to notify when said at least two replication queues and a corresponding replication disk queue capacity reach a preselected threshold.

29. The method according to claim 28, further comprising:
redirecting the transactions to at least one of said at least two replication queues being below said preselected threshold, based on receiving the alert.

* * * * *